United States Patent [19]
Bott

[11] 3,848,785
[45] Nov. 19, 1974

[54] SKI RACK FOR MOTOR VEHICLES

[76] Inventor: John A. Bott, 931 Lake Shore Dr., Grosse Pointe Shores, Mich. 48236

[22] Filed: May 14, 1973

[21] Appl. No.: 360,096

[52] U.S. Cl............................ 224/42.1 F, 211/60 SK
[51] Int. Cl............................................... B60r 9/12
[58] Field of Search...... 224/42.1 F, 42.1 E, 42.1 D, 224/42.1 R, 45 S, 29 R; 280/11.37 K, 11.37 A, 11.37 C; 211/60 SK

[56] References Cited
UNITED STATES PATENTS

| | | | |
|---|---|---|---|
| 2,133,883 | 10/1938 | Aubert | 280/11.37 A |
| 3,323,302 | 12/1965 | Helm | 224/42.1 F |
| 3,348,747 | 10/1967 | Vuarchex | 224/42.1 F |

*Primary Examiner*—Robert G. Sheridan
*Assistant Examiner*—Jerold M. Forsberg
*Attorney, Agent, or Firm*—Harness, Dickey & Pierce

[57] ABSTRACT

A ski rack of the type having two identical spaced ski holders mounted on the roof of a vehicle. Each holder has a molded plastic base provided with slots in which the skis are set on edge. Ski poles are held in clips mounted on bosses located between the slots so that a pair of closure bars will lock both the skis and the poles in place. Alternatively usable supports are provided for the holders; one for mounting the holders on a luggage rack and the other designed for strapping the holders to the roof rain gutters. With either method of support, the holders are conveniently removable from the vehicle without disturbing their supports.

7 Claims, 8 Drawing Figures

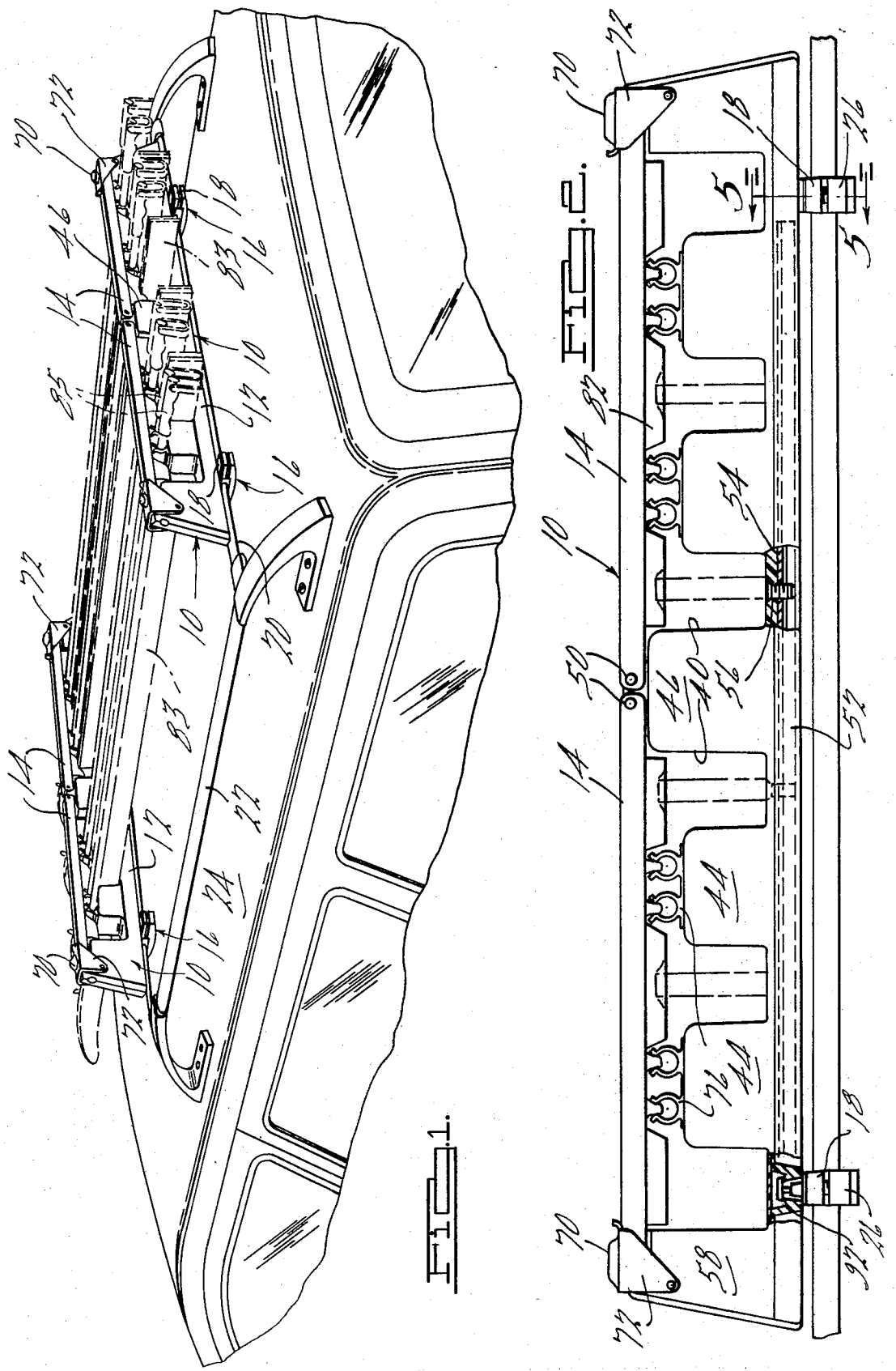

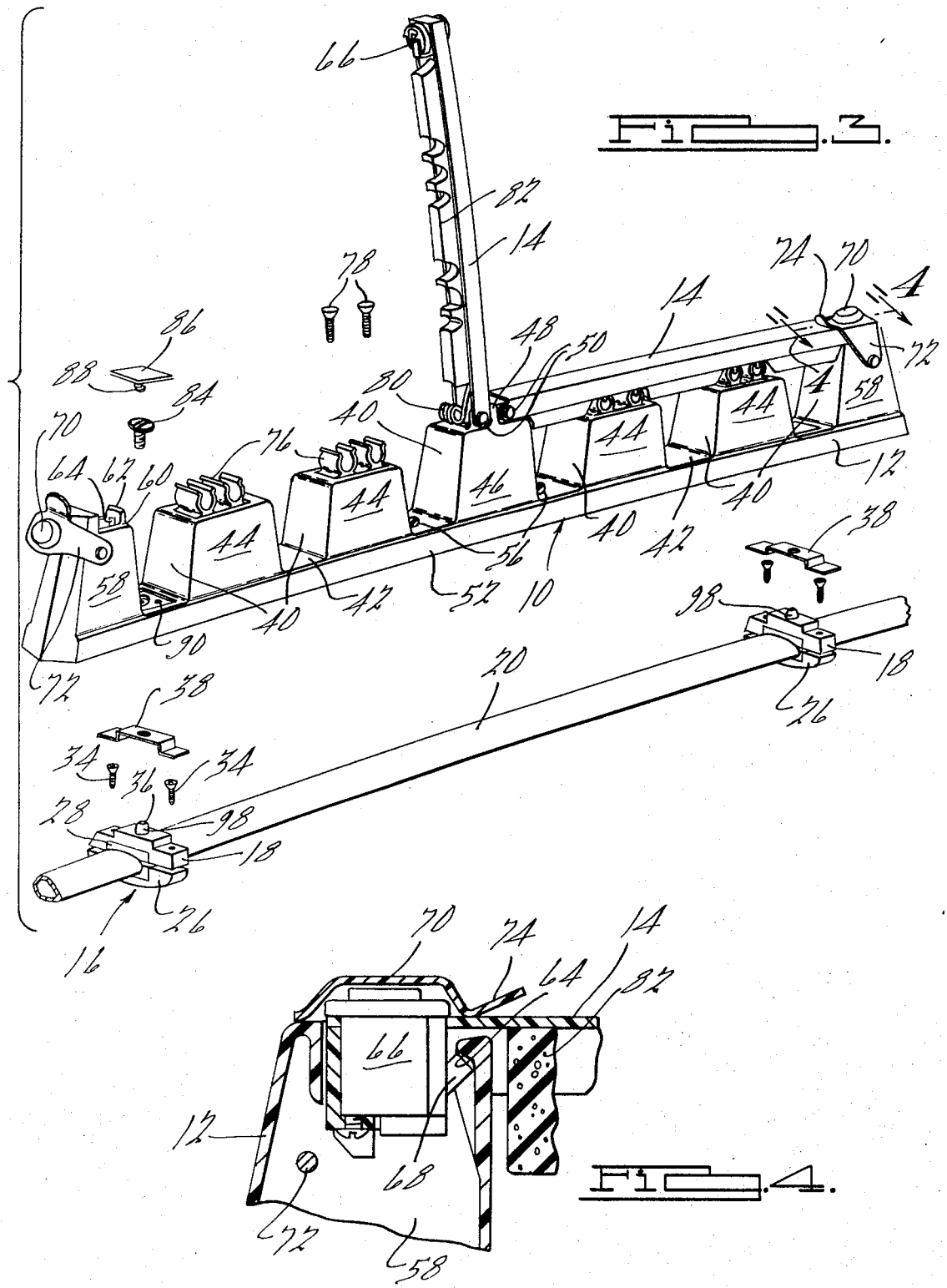

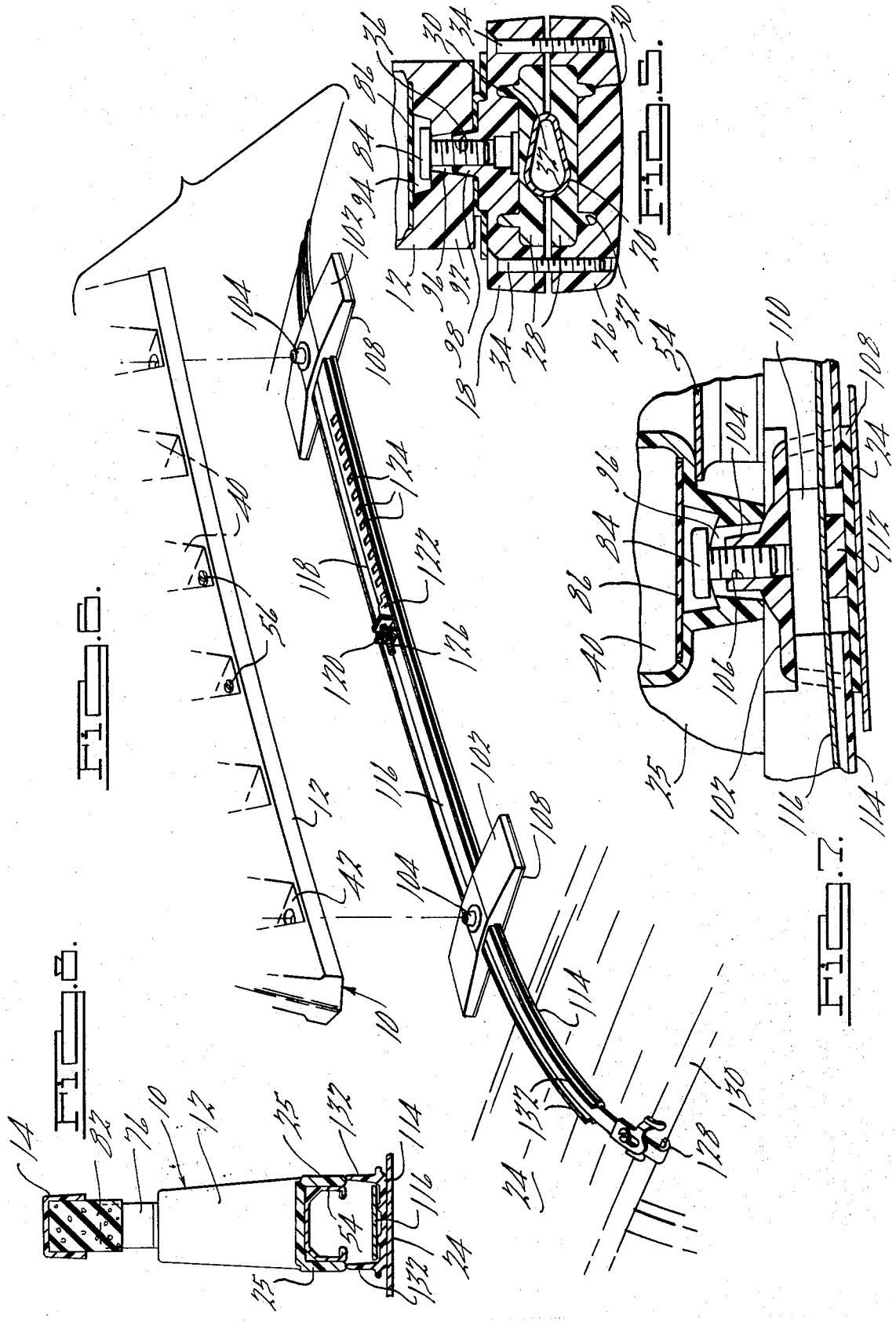

SKI RACK FOR MOTOR VEHICLES

SUMMARY OF THE INVENTION

The ski rack of the present invention employs a pair of identical ski holder assemblies which are readily detached from the supporting or mounting means by which they are fastened on the roof of a vehicle. According to one form of the invention the holders are secured to the cross bars of a luggage rack. Two supports for each holder are mounted on the luggage rack and they are small enough so that they may be left on the luggage rack throughout the skiing season. The holders are readily fastened to and removed from each of these supports by a single screw which is conveniently accessible from the top of the holder. Thus, the holders can be frequently removed from and installed on their supports during the ski season with a minimum of inconvenience.

According to another form of the invention, supports are strapped directly to the rain gutters of the vehicle roof. The holders are screw fastened to these supports in the same manner as the first form of the invention. Thus, the ski holders may be either fastened directly on the roof of the car or to a luggage rack in accordance with the needs of the user.

The ski rack of the present invention is particularly attractive in construction, its major component being preferably made from molded plastic. This main component comprises a base member having slots in which the skis are set on edge. The slots are separated by raised bosses on the tops of which U-shaped ski pole clips are fastened. These clips serve to support the ski poles at the same general elevation as the upper edges of the skis. Thus, common closure bars may be utilized to fasten both the skis and the poles in position on the rack.

It is an object of the present invention to provide a ski rack which will accommodate a large number of skis and poles, which is attractive and durable in construction, which is conveniently removable from the vehicle, which incorporates lock means which is both protected from ice and snow, and which incorporates safety means to prevent accidental opening of the closure bars.

DESCRIPTION OF THE VIEWS OF THE DRAWINGS

FIG. 1 is a perspective view showing a ski rack constructed in accordance with the principles of the present invention mounted on the luggage rack of an automobile roof;

FIG. 2 is an elevational view, partly in section, of one of the ski holders of the luggage rack of FIG. 1, the skis and poles being removed from the rack;

FIG. 3 is a partially exploded perspective view of the structure illustrated in FIG. 2, one of the closure bars being shown in a raised position;

FIG. 4 is an enlarged sectional view of the structure illustrated in FIG. 3 taken along the line 4-4 thereof;

FIG. 5 is an enlarged sectional view of the structure illustrated in FIG. 2 taken along the line 5-5 thereof;

FIG. 6 is an exploded perspective view showing a modified support for the holders shown in FIGS. 1-5;

FIG. 7 is a sectional view of the structure illustrated in FIG. 6 showing the structure at the juncture of a support and the base; and FIG. 8 is a sectional view of the structure illustrated in FIG. 6 in a location intermediate the supports.

DESCRIPTION OF THE PREFERRED EMBODIMENTS

Both forms of the ski rack illustrated herein employ a pair of ski holders 10 composed, basically, of a molded plastic base 12 and a pair of pivoted closure bars 14. The base 12 is designed to be secured to and mounted on supporting means indicated generally at 16. In the form of the invention illustrated in FIGS. 1 to 5, the supporting means comprises a pair of transversely spaced supports 18. The supports 18 are positioned on the cross bars 20 of a luggage rack 22 mounted on a vehicle roof 24. The supports 18 are paired with and held in place by clamps 26 positioned beneath the cross bars 20. Both the clamps 26 and the supports 18 are recessed to receive adapters 28 molded to fit the particular cross sectional shape of the cross bar 20. The product is intended to be sold with a selection of adapters from which the purchaser can select a pair of adapters 28 which best fit his luggage rack. The adapters 28 are provided with projections 30 frictionally fitted in apertures 32 of the clamp 26 and supports 18. Each clamp 26 is secured to its mating support 18 by a pair of screws 34. Each support 18 has a threaded opening 36 extending downwardly from the upper surface thereof. A cover plate 38 is apertured in the area above the opening 36 and is positioned to cover the screws 34 to prevent unauthorized removal of the supports 18 from the luggage rack 22 when the entire structure is assembled and in place on a car.

The base 12 is formed with a plurality of slots 40 which are spaced apart in a direction transversely of the vehicle. Each slot 40 has a bottom wall 42 on which the edges of the skis rest. The slots 40 are separated by raised intermediate bosses 44 and a main central boss 46. A raised shoulder 48 is formed on the central boss 46, the closure bars 14 being pivoted to said shoulder by pivot pins 50. The lower area of the base 12 has a pair of depending continuous sidewalls 25 between which a channeled-shaped metal reinforcing member 54 is fitted. The reinforcing member 54 is secured in place by screws 56 and generally reinforce the entire structure of the base 12.

End bosses 58 are formed at the opposite ends of the base 12 and provide ledges 60 on which the ends of the closure bars 14 will rest when they are lowered. The closure bars 14 which are of inverted U-shaped cross section, are moved down over a raised wall 62 on the end bosses 58. Each wall 62 provides a locking shoulder 64. Lock cylinders 66 are carried at the ends of the closure bars 14 so that a tongue 68 of each lock cylinder will engage a shoulder 64 to secure the closure bars in the lowered or closed position.

A generally inverted U-shaped latching cover plate 70 is pivoted on each end boss 58 so as to move from a retracted position shown at the left hand end of the base 12 in FIG. 3 to a position over the end of the adjacent closure bar as shown at the right hand end of the base in FIG. 3. Thus, the latching cover plates 70 perform two functions: they protect the lock cylinders 66 from the entrance of water and snow into their keyholes and they guard the closure bars against upward pivotal movement should the lock fail to latch against the shoulder 64 properly. A raised lip 74 on one end of the latching cover plate 70 facilitates its movement between the open and closed positions.

Fastened to the top of the intermediate bosses 44 are pole retaining clips 76, each of which provides two upwardly open slots for the reception of ski poles. The clips 76 are located so as to position the ski poles they receive at approximately the same elevation as the upper edges of the skis which are positioned in the slots 40. The pole clips 76 are nested into the upper ends of the intermediate bosses 44 and are retained in place by means of screws (not shown).

The closure bars 14 are biased to an open, upwardly extending position as illustrated by the left hand closure bar 14 in FIG. 3. This biasing force is provided by coil springs 80 interposed between the central boss 46 and each of the closure bars 14. Recessed into each of the closure bars 14 is a foam rubber cushion 82 which is suitably notched to accommodate the pole retaining clips 76 and to contact ski poles 85 and skis 83 which are shown in position on the ski rack in FIG. 1.

The base 12 of each holder 10 is removably attached to a pair of supports 18 by means of two relatively large screws 84. The screws 84 are normally covered by a cover plate 86 having depending tangs 88 frictionally engageable in openings 90 formed in the base 12. The screws 84 are located at the bottoms of a pair of the slots 40. The head of each screw 84 will be seen to rest in a pocket 94 formed in a wall 92 comprising a downward continuation of the bottom 42 of said slots 40. The screw 84 will be seen to project through an elongated opening 96 extending completely through the wall 92 so that the screws 84 may enter the openings 36 of the supports 18. It will be seen that each support 18 has a raised projection 98 surrounding the opening 36 and fitted in the opening 96. The purpose of the elongation of the opening 96 is to permit some inclination of the axis of the opening 36 with respect to the base 12.

From the foregoing it will be appreciated that the cover plates 86 constitute the bottoms of the slots 40 in which they are positioned and prevent the entrance of snow and water and ice into the area of the heads of the screws 84. The cover plates 86 may be easily pried off with a screwdriver and the screws 84 unthreaded without any danger of the removal of the holders 10 being impaired by the presence of ice or snow.

A somewhat modified form of the invention will be found in FIGS. 6, 7 and 8. This form of the invention utilizes the same ski holders 10. However, the supporting means for the ski holders 10 is different in this form of the invention and is intended for a car which does have a luggage rack. The holder supporting means for this form of the invention will be seen to include a pair of transversely spaced supports 102 which may be made of molded plastic. The supports 102 have upwardly extending central projections 104 defining upwardly open threaded holes 106. The supports 102 rest on soft plastic pads 108 and define transverse slots 110 extending transversely therethrough in the area immediately beneath the projections 104. A wall 112 extends across the bottom of the slots 110 in the center thereof, while the opposite ends of the slots 110 accommodate the ends of soft vinyl strap pads 114. The strap pads 114 provide a rest for a pair of metal straps 116 and 118. The strap 116 has a raised flange 120 at its inner end which confronts a metal clip 122 adjustably fitted in one of a plurality of slots 124 formed in the strap 118. A screw 126 connects the flange 120 to the clip 122 in order to tighten the straps 116, 118. Hooks 128 will be seen to be formed on the outer ends of the straps 116 and 118 to engage a conventional rain gutter 130 formed along the opposite sides of the automobile roof 24. The strap pads 114 are of U-shaped cross section and have raised sidewalls 132 which shield the straps 116, 118 from view in the area between the supports 102. As shown in FIG. 8, the walls 132 will be seen to come upwardly to meet the base opposed walls 25. The clip 122, flange 120 and adjusting screw 126 are all disposed within the confines of the reinforcing member 54 and are thus also hidden from view. In order to remove the holders 10 from the supports 102, it is simply necessary to remove the cover plates 86 and unthread the screws 84, as in the preceding form of the invention.

The removal of the holders 10 from a vehicle is particularly desirable to permit the vehicle to be run through most conventional car washes which do not ordinarily accept vehicles with ski racks mounted thereon. This is due to the interference of the ski rack with the brushes which are normally moved over the top of the vehicle. However, the supports 102 and straps 116 and 118 may be left on the vehicle without interferring with auto wash equipment.

Ski racks are frequently used by skiers on weekends. It will be seen that the ski holders 10 may be installed on either the supports 18 or 102 for a weekend by means of four screws 84 and conveniently removed from the automobile at the end of the weekend. The supports 18 or 102 can be left on the vehicle for the entire ski season.

what is claimed is:

1. A ski rack for an automotive vehicle including a pair of longitudinally spaced holders each including a base provided with a plurality of upstanding bosses defining recesses therebetween adapted to accommodate skis with their edges set on the bottoms of said recesses, a plurality of upwardly open pole receptacles on the tops of said bosses and at least one closure bar assembly pivoted on said base and arranged to contact both the upper edges of skis in said recesses and poles in said receptacles, spaced supports engageable with the underside of each of said bases, fasteners connecting said bases to said supports, and independent attaching means for connecting said supports to the vehicle body whereby said bases and their closure bars may be removed from said supports without disturbing said attaching means and supports.

2. The structure set forth in claim 1 in which said supports are clamped to portions of a luggage rack mounted on the roof of the vehicle.

3. The structure set forth in claim 1 in which said supports are strapped to rain gutters extending along the opposite sides of the roof of the vehicle.

4. The structure set forth in claim 3 including strap tensioning means for each of said holders which is covered by the bases thereof.

5. The structure set forth in claim 1 in which the base of each holder comprises a molded plastic member having a channel-shaped metal reinforcement fitted therein.

6. The structure set forth in claim 1 in which said fasteners comprise screws extending through said bases at the bottoms of some of said recesses.

7. The structure set forth in claim 1 including a clamp for each of said supports securing each support to a portion of a luggage rack and adapter means fitted between each support and clamp and its associated luggage rack portion, said adapter means being conformably shaped to said luggage rack portion.

* * * * *

UNITED STATES PATENT OFFICE
CERTIFICATE OF CORRECTION

Patent No. 3,848,785        Dated November 19, 1974

Inventor(s) JOHN A. BOTT

It is certified that error appears in the above-identified patent and that said Letters Patent are hereby corrected as shown below:

Column 4, after line 30
before the claims, insert

-- It will be apparent that the ski holders 10 are capable of holding six pairs of skis. These skis, as well as the poles mounted in the pole retaining clips 76 are securely retained in place by the closure bars 14. Should the lock cylinders 66 fail to latch properly when the closure bars 14 are closed, the movement of the latching covers 70 into positions over the closure bars 14 will prevent the upward pivotal movement of the closure bars as well as preventing the locks from icing up. --

Signed and sealed this 4th day of February 1975.

(SEAL)
Attest:

McCOY M. GIBSON JR.
Attesting Officer

C. MARSHALL DANN
Commissioner of Patents